(12) United States Patent
Wegner

(10) Patent No.: US 7,108,792 B2
(45) Date of Patent: Sep. 19, 2006

(54) PROCESS FOR CLEANING WASH WATER

(76) Inventor: Paul Wegner, 1340 Eaton Ave., San Carlos, CA (US) 94070

( * ) Notice: Subject to any disclaimer, the term of this patent is extended or adjusted under 35 U.S.C. 154(b) by 0 days.

(21) Appl. No.: 11/193,265

(22) Filed: Jul. 30, 2005

(65) Prior Publication Data

US 2005/0263740 A1 Dec. 1, 2005

Related U.S. Application Data

(62) Division of application No. 10/754,005, filed on Jan. 8, 2004, now abandoned.

(60) Provisional application No. 60/438,959, filed on Jan. 9, 2003.

(51) Int. Cl.
*C02F 1/62* (2006.01)
*C02F 101/30* (2006.01)

(52) U.S. Cl. .................. 210/725; 134/25.1; 210/727; 210/728; 210/906; 210/912

(58) Field of Classification Search ................ 210/724
See application file for complete search history.

(56) References Cited

U.S. PATENT DOCUMENTS

| 3,954,403 | A | * | 5/1976 | Ferraro .................... 8/137 |
| 4,802,991 | A | * | 2/1989 | Miller .................... 210/705 |
| 5,523,000 | A | * | 6/1996 | Falbaum et al. ............ 210/708 |
| 5,785,863 | A | * | 7/1998 | Varner et al. .............. 210/724 |
| 5,807,487 | A | * | 9/1998 | Lahti ..................... 210/665 |
| 5,820,695 | A | * | 10/1998 | Lance-Gomez et al. ...... 134/42 |
| 5,935,448 | A | * | 8/1999 | Miller .................... 210/705 |
| 6,632,291 | B1 | * | 10/2003 | Rabon et al. .............. 134/26 |
| 6,926,837 | B1 | * | 8/2005 | Schwetlick ............... 210/728 |

* cited by examiner

*Primary Examiner*—Peter A. Hruskoci
(74) *Attorney, Agent, or Firm*—Frank J. Benasutti

(57) ABSTRACT

Agents are used as cleaning agents and also as agents to purify the water in water treatment plants. The agents are a mixture of phosphates and fatty acid salts. Precipitation agents are used such as, polyvalent metals. The pH is adjusted. Flocking agents can be used to increase the rate of separation. The purified water is removed after precipitation.

5 Claims, No Drawings

PROCESS FOR CLEANING WASH WATER

CROSS REFERENCE TO RELATED APPLICATIONS

This application is a divisional of application Ser. No. 10/754,005, filed Jan. 8, 2004 now abandoned, and Provisional patent application Ser. No. 60/438,959, filed Jan. 09, 2003 the disclosures of which are incorporated herein by reference as if fully set forth.

BACKGROUND OF THE INVENTION

1. Field of the Invention

This invention relates to a washing soap and a method for cleaning the resulting wash water.

2. Description of the Art

Many industrial operations involve the cleaning of machinery, clothing, building areas, and personal. The waste water generated from these wash operations often contain environmental toxins such as heavy metals, and organic toxins. Many cleaning agents make water treatment difficult, especially when environmental pollutant removal is required.

It is desirable to have a mild nontoxic cleaning agent that does an excellent job of cleaning equipment, building areas, clothing, and personnel. In addition, it is desirable that the same cleaning agent does an excellent job of cleaning the waste wash water in the water treatment area. The cleaning agent itself should place no burden on the environment. The agent should be inexpensive and be readily available throughout the world.

Phosphates have been used as cleaning agents for several years. There have been many attempts to restrict their use because they stimulate algae growth. However, they are required to sustain life.

Fatty acid salts have long been used in the soap industry. Recently soft soaps that are based on potassium fatty acid salts have been introduced.

In earlier patents I have introduced the concept of using fatty soaps as agents to remove environmental toxins. Some municipal water treatment plants have used phosphates to reduce the level of heavy metals in their treated water.

DISCLOSURE OF THE INVENTION

Summary of the Invention

In accordance with my invention agents are used as cleaning agents and also as agents to purify the water in water treatment plants. For example, a lead acid battery manufacturing plant could replace their existing cleaners with this new double duty cleaning agent. This approach has the following benefits:

1. Superior cleaning power;
2. Elimination of cleaning agents (such as detergents and nonionic surfactants) which make water treatment difficult and expensive;
3. Elimination of environmentally toxic soaps such as nonionic surfactants which act as estrogen mimics that harm reproductive health;
4. The customer is already paying for soap. Since the new soap acts as a cleaner and a water treatment agent the overall cost is less for the customer; and
5. By using the soap in all cleaning operations, the customer does not have to worry about variable water treatment quality due to the wide variety of cleaning agents used in industrial applications.

I have invented a soap comprising phosphate salt and fatty acid salts, in combination. The phosphate salt is selected from the group of cations consisting of: hydrogen; ammonium; lithium; potassium; and sodium; and the group of anions consisting of: phosphate; pyrophosphate; and polyphosphate.

The fatty acid salt is selected from the group of anions consisting of:
  any fatty acid having carbons in the range of 6 to 36;
  any aromatic acid having carbons in the range of 6 to 36;
  branched chain fatty acid;
  straight chain fatty acid;
  unsaturated fatty acid;
  polyunsaturated fatty acid; and
  aromatic acid;
and the group of cations consisting of:
  potassium;
  lithium;
  sodium;
  ammonium; and
  amine.

The soap can be fortified by the addition of an alkaline metal salt that has a pH greater than 7.

I have also invented a process for treating water comprising:
  mixing a phosphate fatty acid salt mixture with the water;
  mixing a polyvalent metal precipitation agent with the water mixture;
  adjusting the pH of the mixture to be in the range of 4 to 9; and
  separating purified water from precipitant.

In this process the precipitation agent may be calcium chloride and the pH may be adjusted within a pH range of 6 to 9.

In my process the precipitation agent may be selected from the group of anions consisting of:
  polyvalent metal ion;
  calcium;
  magnesium;
  aluminum; and
  iron.

In my process there may be an additional step of adding flocking agents to the mixture before separating the purified water from precipitant.

In my process there may be a step of adjusting the pH comprising adding acids, bases or salts.

I have also invented a washing and water treatment process comprising the steps of:
  washing articles with soap comprising phosphate salt and fatty acid salts, in combination and water;
  and then, treating the resulting soap/water mixture by a process comprising:
  mixing a polyvalent metal ion precipitation agent with the soap/water mixture;
  adjusting the pH of the mixture to be in the range of 4 to 9; and
  separating purified water from the resulting precipitant.

DESCRIPTION OF THE PREFERRED EMBODIMENTS

My invention is a product and a process. In the first step, I wash an object with a potassium phosphate soap. This can be done, for example, by putting the potassium phosphate on a towel in the form of a soap and then washing an object with the towel.

In the extra-clean version of this invention, I use potassium fatty acid salts and potassium phosphate.

Next I rinse the towel and my hands with water. In this case, both would come clean.

I collect the dirty wash water.

Then I add calcium chloride to the dirty water so that all of the soap and dirt precipitate out, leaving only potassium chloride and water. This can be collected by decanting it. This is, in fact, fertilizer.

Upon initial examination, the properties of cleaners and water treatment chemicals appear to be exclusive of one another. Cleaners usually are designed to remove dirt by the promotion of mixing with or dissolution in water via emulsification, suspension, complexation, dissolution, and a host of other mechanisms. Meanwhile, the goal of water treatment is to remove all the dirt from the water. Therefore, the better the soap the harder it is to treat the water. Many common soaps require oxidation or bacterial decomposition to make water treatment even possible.

The best natural soaps actually make the best water treatment agents when processed properly. For example, phosphates emulsify many grease like materials and can soften very hard water. If one treats the dirty wash water with standard water treatment chemical salts (such as magnesium, calcium, iron, aluminum salts), the phosphates are converted to highly water insoluble salts such as magnesium, calcium, iron, or aluminum phosphates and nontoxic salts such as sodium sulfate or sodium chloride that have minimal soap or metal complexing properties. In addition, formation of these insoluble phosphate salts co-precipitate with many toxic metals such as lead, cadmium, or mercury.

I use trisodium phosphate (TSP, a well known cleaner) for cleaning, followed by precipitation with polyvalent metal salts such as aluminum sulfate, magnesium sulfate or calcium sulfate in the water treatments area. This approach leads to reasonable cleaning and a reduction of heavy metals in the treated water to about 80 parts per billion (PPB). However, drinking water standards require even lower heavy metal levels. The standard for lead is less than 15 PPB.

When fatty acid soaps are added to the phosphates both cleaning and water treatment performance are increased. In the case of water treatment, lead levels are reduced to less than 1 PPB.

The use of sodium phosphates and sodium fatty salts have a few disadvantages.

1. Sodium in waste water streams contribute to ground water sodium ion buildup which is toxic to many agricultural plants;
2. Sodium phosphate has inferior cleaning action compared to ammonium or potassium phosphate;
3. Sodium fatty acid salts have inferior cleaning action compared to ammonium or potassium salts; and
4. Sodium fatty acid salts tend to form stiff water gels, such as bar soap, that are inconvenient to use compared to liquid ammonium or potassium salt counterparts.

Potassium salts are preferred over ammonium salts because they have superior cleaning action, are odorless, and do not interfere with water treatment quality. (Ammonium ions tend to form complexes with many metal ions such as copper.)

Potassium ions are nontoxic to plants. Therefore, much higher potassium levels can be tolerated in waste water streams.

Saturated fatty acid salts are preferred over unsaturated because the saturated fatty acids are easier to remove from water. They also are much more stable to oxidation agents such as bleach.

Many fatty acid salts are effective. Potassium myristate (C12 chain) works. Smaller chain fatty acid salts may work, but have bad odors under acid conditions and have poor cleaning power. Chain lengths shorter than C8 are not recommended. Fatty acid salts with chains longer than C18 (stearate) such as behemate (C22) can work, but require shorter chain fatty acid salts to be effective.

The best formulation is a mixture of potassium stearate (C18) and myristate (C14) with tripotassium phosphate. This mixture can remove dirty grease from cloth, machinery, and hands, while being able to remove heavy metals from the water in the water treatment plant. The formulation is a thick liquid that dissolves easily in water.

In the case of laundry, increasing the pH of the wash water to 10–13 by adding alkalizing agents such as potassium hydroxide or potassium carbonate, in addition to the above mixture, can improve cleaning performance. In cases where the clothing is acidic or salty, it is more economical to pre-rinse the clothing with water; preferably with deionized water. Pre-rinsing reduces alkalizing demands and improves cleaning performance by reducing salt loading. Deionized or distilled water is preferred over softened water because softened water has elevated salt levels. Other alkalizing agents such as sodium hydroxide are less preferred, because they reduce washing performance.

The cleaning agent removes many kinds of dirt such as a grease, particulate dirt, and food stains. However, some stains such as rust and metal oxides are best removed after the initial cleaning by applying formic, citric, oxalic, lactic, or acetic acid and many other organic acids. The addition of hydrogen peroxide to these acids can accelerate the cleaning action. This mixture also dissolves many metals and metal oxides, such as lead. Formic acid is preferred because it is easily destroyed with oxidation agents such as bleach. Formic acid and its salts must be destroyed in the water treatment area because they interfere with the removal of metal ions from the water by forming stable complexes.

Soap Formulation:

| Material | Amount in grams |
| --- | --- |
| Stearic acid | 15 |
| Myristic acid | 15 |
| Potassium Hydroxide | 10 |
| Tripotassium Phosphate | 30–100 |
| | (30 is sufficient in most cases) |
| Water | 860–930 |
| Total | 1,000 |

NOTE:
Stearic acid (triple pressed, is a mixture of stearic and palmitic acid).

The use of deionized or distilled water improves the cleaning power of the soap. Softened water is better than hard water, but less preferred than distilled or deionized water because it contains salt.

Water Treatment:

The waste water generated from the cleaning process is pooled together and polyvalent metal salts, such as iron sulfate, are added in sufficient amounts to react with most of the phosphate and fatty acid salts in the soap to form the corresponding metallic salts. After mixing thoroughly the pH is adjusted to the range of 6–9 with an alkaline agent such as sodium hydroxide, potassium hydroxide, magnesium hydroxide, ammonia, or calcium hydroxide or an acid such as sulfuric, hydrochloric, or phosphoric acid. Flocking agents can be added to accelerate the rate of coagulation. After the coagulation is complete, the clear water is decanted from the process tank. One may pass the purified water through a filter such as a sand, cartridge, or diatomaceous earth filter to insure complete particle removal.

Chemical Reaction:

$$2K_3PO_4 + 3CaCl_2 = 6KCl \text{ (soluble)} + Ca_3(PO_4)_2 \text{ (insoluble)}$$

$$2K \text{ stearate} + CaCl_2 = 2KCl + Ca \text{ (stearate)}_2 \text{ (insoluble)}$$

Preferred Precipitation Agents

Nontoxic No Environment Burden:

| | |
|---|---|
| Iron Sulfate | yields high quality water |
| Magnesium Sulfate | |
| Calcium Sulfate | Cheapest and least toxic, but slow processing |
| Aluminum sulfate(Alum) | Aluminum toxic to some plants. If no excess is used very little aluminum remains in the water. |

Slightly Less Acceptable Chloride Ion is Toxic to Many Plants at High Levels:
Calcium chloride
Aluminum chloride
Ferric chloride
Magnesium chloride Other Agents: oxides, hydroxides, carbonate, bicarbonates of the polyvalent metal ions (such as iron, calcium, magnesium, aluminum) maybe used, but may not be quite as effective or may require supplemental pH adjustment agents.

Flocking Agents:
Nalco 7194
20 ml of 0.1% for 100 grams of cleaner
Processing conditions pH 7.5 to 8.5 preferred.
For good lead and phosphate removal levels
Nalco Ultimer 1452 is also effective NOTE: Calcium chloride at pH=8 yields the lowest lead levels. Iron salts yield lowest phosphate level.

This invention comprises an agent which has both excellent cleaning power and water purification capability.

The agent also has much better cleaning power than the typical laundry or hand soap.

The high phosphate content which is normally considered damaging because it promotes algae growth, is processed in such a manner that it becomes the primary cleaning and water purification component. The treated water has low phosphate content and therefore does not contribute to algae growth.

The potassium salts have superior cleaning power over sodium salts and unlike sodium salts are nontoxic to plants.

The unique mixture of potassium saturated fatty acid and phosphate salts yields cleaning power and stability not found in other commercial cleaners. Fatty acids of longer or shorter chains have reduced cleaning power.

The invention claimed is:

1. A washing and water treatment process to remove waste materials including heavy metals and organic toxins from articles and wash water, comprising the steps of:

washing the articles with water and soap comprising a fatty acid salt mixture of tripotassium phosphate, potassium stearate and potassium myristate to remove and waste materials from the articles;

collecting the resulting soap/waste material/water mixture; and then treating the resulting soap/waste material/water mixture by a process comprising:

mixing calcium chloride the resulting mixture to form a second mixture;

adjusting the pH of the second mixture to a range of 6 to 9; and then separating out water from the pH adjusted second mixture.

2. The process of claim 1 wherein the fatty acid salt mixture is approximately 30–100 grams tripotassium phosphate, 15 grams potassium stearate, and 15 grams potassium myristate.

3. The process of claim 1 wherein the fatty acid salt mixture includes an unsaturated fatty acid salt.

4. The process of claim 1 wherein the pH is adjusted by adding an agent selected from the group consisting of: potassium hydroxide, sodium hydroxide, magnesium hydroxide, ammonia, calcium hydroxide, sulfuric acid, hydrochloric acid, and phosphoric acid.

5. The process of claim 1 wherein the pH is adjusted to a range of 8 to 9.

* * * * *